United States Patent
Sharifi et al.

(10) Patent No.: US 10,255,922 B1
(45) Date of Patent: *Apr. 9, 2019

(54) SPEAKER IDENTIFICATION USING A TEXT-INDEPENDENT MODEL AND A TEXT-DEPENDENT MODEL

(71) Applicant: Google LLC, Mountain View, CA (US)

(72) Inventors: Matthew Sharifi, Kilchberg (CH); Dominik Roblek, Meilen (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,892

(22) Filed: Jun. 24, 2016

Related U.S. Application Data

(63) Continuation of application No. 13/944,975, filed on Jul. 18, 2013, now Pat. No. 9,711,148.

(51) Int. Cl.
  *G10L 17/24* (2013.01)
  *G10L 17/04* (2013.01)
  *G10L 15/02* (2006.01)
  *G10L 15/22* (2006.01)

(52) U.S. Cl.
  CPC .............. *G10L 17/24* (2013.01); *G10L 15/02* (2013.01); *G10L 15/22* (2013.01); *G10L 17/04* (2013.01)

(58) Field of Classification Search
  None
  See application file for complete search history.

(56) References Cited

U.S. PATENT DOCUMENTS

| | | |
|---|---|---|
| 5,937,384 A | 8/1999 | Huang et al. |
| 5,960,392 A | 9/1999 | Sundberg et al. |

(Continued)

OTHER PUBLICATIONS

El-emary, Ibrahim M.M. et al., "Hidden Markov model/Gaussian mixture models (HMM/GMM) based voice command system: A way to improve the control of remotely operated robot arm TR45," Scientific Research and Essays, vol. 62(2), pp. 341-350, Jan. 18, 2011.

(Continued)

*Primary Examiner* — Michael N Opsasnick
(74) *Attorney, Agent, or Firm* — Fish & Richardson P.C.

(57) ABSTRACT

In some implementations, a single registration utterance that includes a hotword and an introduction declaration is received. A user is registered, including training a text-dependent speaker identification model using the hotword of the single registration utterance and training a text-independent speaker identification model using the introduction declaration of the single registration utterance. An authentication utterance by the user that includes the hotword and a voice command that is different from the introduction declaration is received. The user is authenticated, including processing the hotword of the authentication utterance using the text-dependent speaker identification model and processing the voice command using the text-independent speaker identification model. Access to an access-controlled personal resource of the user is provided without requiring the user to submit any further authentication information other than the single registration utterance by the user that includes the hotword and the introduction declaration to the speech-enabled home device.

20 Claims, 2 Drawing Sheets

(56) References Cited

U.S. PATENT DOCUMENTS

| | | | |
|---|---|---|---|
| 7,386,448 B1* | 6/2008 | Poss | G10L 17/24 379/188 |
| 7,447,633 B2 | 11/2008 | Navratil et al. | |
| 8,099,288 B2 | 1/2012 | Zhang et al. | |
| 8,620,657 B2 | 12/2013 | Farrell et al. | |
| 9,711,148 B1* | 7/2017 | Sharifi | G10L 17/02 |
| 2002/0152078 A1 | 10/2002 | Yuschik et al. | |
| 2003/0009333 A1 | 1/2003 | Sharma et al. | |
| 2003/0125944 A1* | 7/2003 | Wohlsen | G10L 17/24 704/246 |
| 2003/0171930 A1 | 9/2003 | Junqua | |
| 2003/0182119 A1 | 9/2003 | Junqua et al. | |
| 2007/0055517 A1* | 3/2007 | Spector | G06F 21/32 704/246 |
| 2008/0059176 A1 | 3/2008 | Ravi et al. | |
| 2008/0281600 A1 | 11/2008 | Kuppuswamy | |
| 2009/0006264 A1* | 1/2009 | Schultz | G06Q 20/3674 705/67 |
| 2009/0319270 A1 | 12/2009 | Gross | |
| 2010/0131273 A1 | 5/2010 | Aley-Raz | |
| 2012/0016673 A1 | 1/2012 | Das | |
| 2012/0303369 A1 | 11/2012 | Brush et al. | |
| 2013/0080167 A1 | 3/2013 | Mozer | |
| 2013/0173268 A1* | 7/2013 | Weng | G10L 17/22 704/249 |
| 2013/0226582 A1 | 8/2013 | Aley-Raz et al. | |
| 2013/0227651 A1* | 8/2013 | Schultz | G06F 21/32 726/4 |
| 2013/0325473 A1 | 12/2013 | Larcher et al. | |
| 2014/0122087 A1* | 5/2014 | Macho | G10L 17/22 704/275 |
| 2014/0222436 A1* | 8/2014 | Binder | G06F 3/167 704/275 |
| 2014/0278435 A1 | 9/2014 | Ganong et al. | |
| 2015/0019220 A1 | 1/2015 | Talhami et al. | |

OTHER PUBLICATIONS

Laxman, Srivatsan et al., "Text-dependent speaker recognition using speaker specific compensation," Conference on Convergent Technologies for the Asia-Pacific Region TENCON 2003, 4 pages.

* cited by examiner

SPEAKER IDENTIFICATION USING A TEXT-INDEPENDENT MODEL AND A TEXT-DEPENDENT MODEL

CROSS-REFERENCE TO RELATED APPLICATION

This application is a continuation of U.S. application Ser. No. 13/944,975, filed Jul. 18, 2013, the contents of which are incorporated by reference in its entirety.

TECHNICAL FIELD

This specification relates to recognizing the identity of a speaker based on the speaker's voice.

BACKGROUND

In a speech-enabled environment, such as a home or automobile, a user may access information and/or control various functions using voice input. The information and/or functions may be personalized for a given user. In multiple user environments, it may therefore be advantageous to identify a given speaker from among a group of speakers associated with the speech-enabled environment.

SUMMARY

To determine which user is speaking in a multiuser speech-enabled environment, speech-enabled systems may include speaker identification systems. Speaker identification systems as described in this specification may use a combination of two types of models to identify the speaker. For a keyword portion of an utterance, the system may use one or more text-dependent models, and for the remainder of the utterance, the system may use one or more text-independent models. Combining these two types of models may provide enhanced accuracy, in particular during the initial uses of the speaker identification system.

In general, one aspect of the subject matter includes the actions of receiving an audio signal encoding an utterance and determining that a first portion of the audio signal corresponds to a predefined phrase. The actions also include accessing one or more text-dependent models associated with the predefined phrase and determining a first confidence based on the one or more text-dependent models associated with the predefined phrase, the first confidence corresponding to a first likelihood that a particular speaker spoke the utterance. The actions further include determining a second confidence for a second portion of the audio signal using one or more text-independent models, the second confidence corresponding to a second likelihood that the particular speaker spoke the utterance. The actions then include determining that the particular speaker spoke the utterance based at least in part on the first confidence and the second confidence.

In some implementations, the text-dependent models comprise sets of mel-frequency cepstral coefficients (MFCCs) associated with the predefined phrase, each set of MFCCs being associated with an individual speaker. Such implementations involve comparing the one or more sets of MFCCs with a set of MFCCs derived from the first portion of the audio signal to determine the first confidence.

In some implementations, determining a second confidence for a second portion of the audio signal using one or more text-independent models involves deriving a set of mel-frequency cepstral coefficients (MFCCs) from the second portion of the audio signal. The determination also involves accessing one or more Gaussian mixture models (GMMs), each GMM being associated with an individual speaker, and processing the set of MFCCs from the second portion of the audio signal using each of the GMMs to determine the second confidence.

Some implementations involve the additional action of analyzing the first portion of the audio signal using the one or more text-independent models to determine a third confidence, the third confidence corresponding to a third likelihood that the particular speaker generated the utterance. In such implementations, determining that the particular speaker spoke the utterance is based at least in part on the first confidence, the second confidence, and the third confidence.

In some implementations, determining that the particular speaker spoke the utterance includes the actions of combining the first confidence and the second confidence to generate a combined confidence, and determining that the combined confidence for the particular speaker is greater than a combined confidence for any other speaker. Optionally, in such implementations combining the first confidence and the second confidence may include assigning a first weight to the first confidence and a second weight to the second confidence, the first weight being greater than the second weight, and combining the weighted first confidence and the weighted second confidence to generate the combined confidence. Alternatively or in addition, determining that the combined confidence for the particular speaker is greater than a combined confidence for any other speaker may include determining that the combined confidence for the particular speaker is greater than a combined confidence for any other speaker and that the combined confidence satisfies a predetermined threshold.

In some implementations, determining that the particular speaker spoke the utterance includes determining that the particular speaker from among a plurality of speakers spoke the utterance based at least in part on the first confidence and the second confidence.

In some implementations, the actions further include combining the first confidence and the second confidence to generate a combined confidence and determining that the combined confidence for the particular speaker is greater than a threshold. Based on this determination, the actions then include initiating an update of a text-dependent model associated with the particular speaker, a text-independent model associated with the particular speaker, or both, using the audio signal encoding the utterance.

The details of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
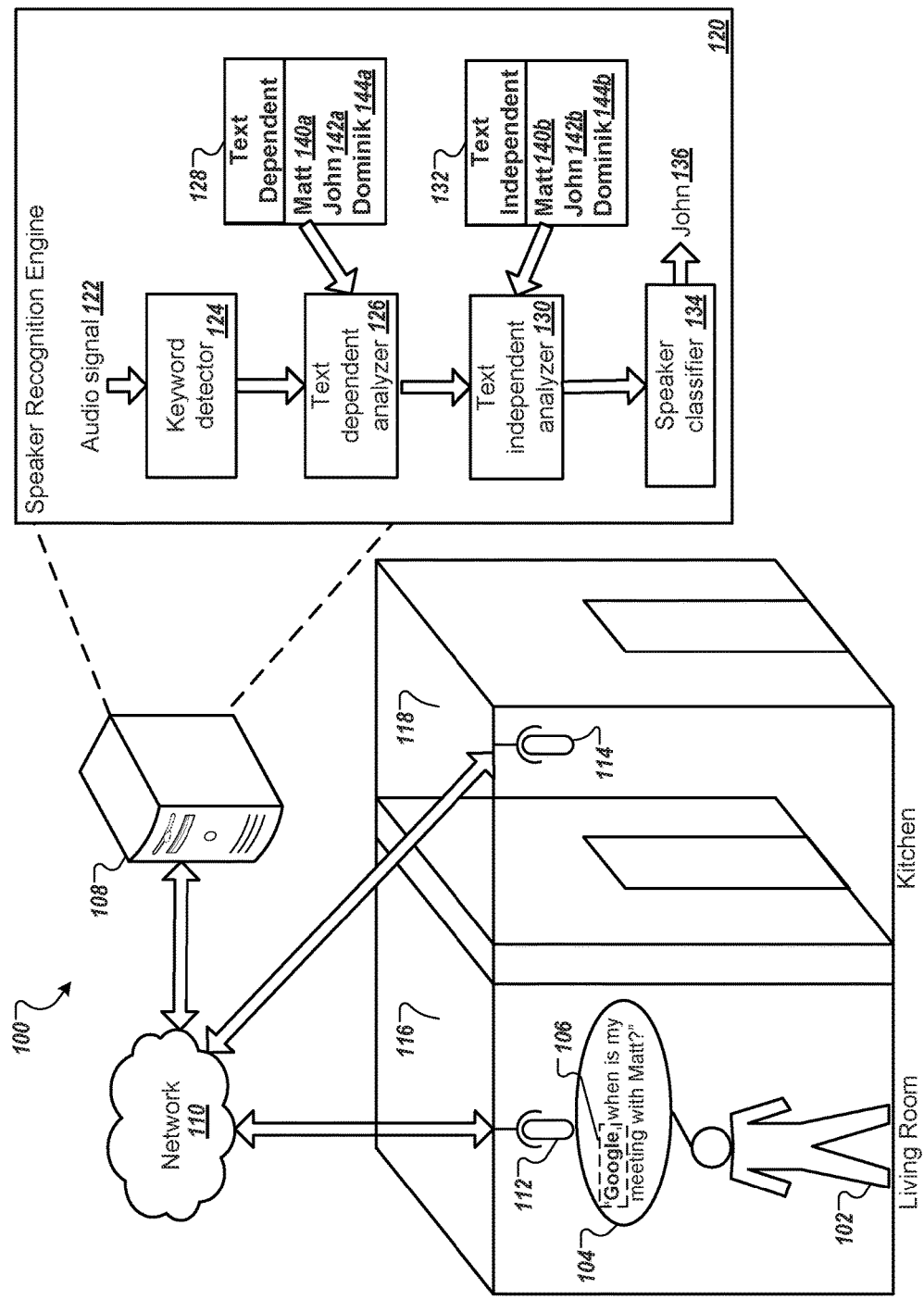
FIG. 1 illustrates an example speaker identification system.

In a speech-enabled environment, such as a home, automobile, workplace, or school, a user may speak a query or command and a computer-based system may answer the query and/or cause the command to be performed. Such a speech-enabled environment can be implemented using a network of connected microphone devices distributed throughout the various rooms or areas of the environment. Through the network of microphones, a user can query the system without having to have a computer or other device in front of them. In some cases, a user may ask a query of the system, and/or issue a command, that relates to the user's personal information. For example, a particular user might ask the system "when is my meeting with Matt?" or command the system "remind me to call Matt when I get back home."

In some instances, the speech-enabled environment may be associated with multiple users, e.g., all of the people who live in a household. This may also apply when a single device is shared by multiple users such as a desktop, laptop, smart television, or tablet. The speech-enabled environment may have a limited number of users, e.g., between 2 and 6 people in a speech-enabled home or automobile. In such cases, it may be desirable to determine the identity of the particular user who is speaking a query. The process of determining a particular speaker may be referred to as voice recognition, speaker recognition and/or speaker identification. Speaker identification may allow a user to issue queries that act on behalf of a particular user or trigger personalized response in multi-user environments.

The speech-interface may be triggered using a keyword (e.g., "Google") that can be used as a basis to perform text-dependent speaker identification. This text-dependent speaker identification facilitates voice recognition based on limited training data. However, performing identification using a single keyword as training data may be challenging, in particular when trying to discriminate between speakers using, for example, approximately 500 ms of audio. To mitigate these difficulties, this specification describes a technique of training a keyword-based speaker identification system using two models: a text-dependent model and a text-independent model.

As described in more detail below, when a user registers with the system, they speak a registration phrase in a [KEYWORD] [IDENTIFICATION INFORMATION] format such as "Google, this is John." The first word "Google" is the keyword and is used as the prefix for future queries. The first of two models—the text-dependent model—is trained using the keyword from this registration phrase. In some implementations, this text-dependent model is based on extracting mel-frequency cepstral coefficient (MFCC) features from the keyword sample and using these features as a reference for future comparison. As this sample represents a small amount of training data, e.g., less than half a second for some speakers, it may be advantageous to improve recognition without requiring the speaker to provide more keyword samples. In particular, it may be desirable to have the speaker utter the registration phrase "Google, this is John" only once.

To that end, the system may use the remainder of the registration phrase, e.g., "this is John" to train a text-independent model. This text-independent model may initially be less reliable than the text-dependent model, but it is trained on longer sections of speech and may act as a valuable second signal. Optionally, the system may include the keyword in the training of the text-independent model. The text-independent model may be a Gaussian mixture model (GMM) trained over the MFCCs for the registration phrase uttered by the user. As a result of the registration process, for each user, the system may store a set of MFCC vectors that correspond to a text-dependent model, and a GMM that corresponds to a text-independent model.

After registration, when a registered user speaks a query, the system detects the presence of the keyword and extracts MFCCs from that segment of the speech. The system also extracts MFCCs from the remainder of the utterance. Then, for one or more of the users registered with the system, the system performs at least two comparisons. The first comparison is a text-dependent comparison that compares the set of MFCCs from the spoken keyword with the stored keyword's MFCC vectors. This provides a first confidence. The second comparison involves processing the MFCCs extracted from the remainder of the utterance to compute a confidence by passing them through the text-independent model. In some implementations, the keyword may also by processed using the text-independent model to generate an additional confidence. The system may then generate a combined confidence by combining the two (or three) confidences. The combined confidence may weight the confidence scores as described in more detail below. The system then provides a speaker identification result based on selecting the speaker with the highest combined confidence, which may also have to meet a minimum threshold.

Once the system has identified a speaker, the system may use the utterance of that speaker to further train the text-dependent and/or text-independent models. In such cases, the system may have a minimum threshold for the combined confidence, which may be greater than the minimum threshold for speaker identification.

FIG. 1 illustrates an example speaker identification system 100. The system 100 may be deployed in a speech-enabled environment such as a home having a living room 116 and a kitchen 118, which is outfitted with a network of microphones 112, 114. The microphones 112, 114 are arranged in the home such that when a user 102 speaks an utterance 104, at least one of the microphones 112, 114 will pick up the utterance 104. The microphones 112, 114 in turn are connected, via a network 110, to a server 108, which may be located within the speech-enabled environment, may be remotely located, or may have functionality distributed between the speech-enabled environment and one or more remote locations. The server 108 may be computing device or computing devices that take the form of, for example, a standard server, a group of such servers, a rack server system, a personal computer such as a laptop or desktop computer, a smartphone, a tablet, or any combination of these. The server 108 includes a speaker recognition engine 120 that is configured to receive an utterance from a user and perform speaker identification on the received utterance.

Speaker identification systems as described in this specification may use a keyword. A keyword is a predefined word or phrase that a user speaks to initiate speech-enabled queries and/or commands. In multiple user environments, the keyword may be agreed to by all of the users in the speech-enabled environment. While some implementations discussed elsewhere in this specification discuss detecting a single keyword, implementations are not necessarily limited to detecting one keyword. In fact, some implementations may be used to detect a plurality of keywords. The keywords in these implementations may also be short phrases. Such implementations allow a user to select one of a certain number of actions, such as actions presented in a menu, by saying one of the menu entries. For example, implementations may use different keywords to trigger different actions such as taking a photo, sending an email, recording a note, and so on.

For example, in the system shown in FIG. 1, the keyword 106 is "Google." Each time the word "Google" is spoken, it is picked up by one of the microphones 112, 114, conveyed to the server 108, which performs speech recognition techniques to determine whether the keyword was spoken. If so, the server 108 processes an ensuing command or query. Accordingly, utterances directed at the server 108 may take the general form [KEYWORD] [QUERY], where "KEYWORD" in this example is "Google" and "QUERY" can be any question, command, declaration, or other request that can be speech recognized, parsed and acted on by the server 108. Any other suitable word or phrase may be used as the keyword such as, for example, "Okay glass."

In a multi-user, speech-enabled environment 100 such as shown in FIG. 1, in which any of multiple different users may be issuing a query or command (e.g., user 102 shown in FIG. 1 could be any of "Matt," "John," or "Dominik"), the server 108 may need to identify the user speaking any given utterance to properly respond to a command or query. For example, in FIG. 1, user 102 has spoken the utterance 104 "Google: When is my meeting with Matt?" To answer this query, the server 108 must access the speaker's online calendar and search it for an upcoming meeting in which the name "Matt" appears. But because the speaker of the utterance 104 may be any of at least three different users (Matt, John, or Dominik), the server 108 may have difficulty determining, without more information, which user's online calendar to access. Consequently, the server 108 first determines the identity of the speaker and then accesses that user's personal resources, such as his or her online calendar, to respond to the query. To do so, the server 108 may use the keyword 106 for two purposes: (i) to determine when the server 108 is being addressed; and (ii) to determine the identity of the keyword speaker. In other words, the keyword is used both as a trigger that informs the server 108 that it should process a received utterance and as a fixed word for purposes of speaker identification.

Specifically, in conjunction with determining that the keyword "Google" has been uttered by a user (which informs the server 108 that the server is being addressed), the server 108 also compares the spoken keyword with stored, previously uttered instances of the keyword by each of the users in the multi-user environment 100. This keyword comparison may be based on text-dependent models. The server 108 may also perform speaker recognition on the utterance 104 using text-independent models as described in more detail below.

To establish the text-dependent and text-independent models associated with users, the server 108 may be trained in a registration session. During the registration session, the server 108 creates and/or modifies a user account for a particular user and associates the user account with a text-dependent model and a text-independent model. A registration session may involve, among other things, uttering the keyword, e.g., "Google," into a microphone 112, 114 and providing other information, e.g., an identification declaration such as "this is John," sufficient for the server 108 to associate each user's keyword utterance with their respective usernames and thus their respective user accounts.

In an example registration session, the server 108 detects an utterance from a user, for example, an introduction query such as "Google: this is John." Next, the server 108 determines (e.g., using speech recognition) that the received utterance includes a keyword (e.g., a keyword, in this example "Google") followed by an introduction declaration (e.g., "this is John"). The server 108 then compares speaker identification features of the uttered keyword with speaker identification features of each of a plurality of previous keyword utterances, each of which corresponds to a different known username, each of which in turn corresponds to a known speaker. Based on the comparison, the server 108 may determine that the user associated with the uttered keyword fails to correspond to any of the known usernames.

As a result, the server 108 performs speech recognition on the introduction declaration (e.g., "this is John") to determine a username of the user (e.g., John"). The server 108 then associates the determined username, and thus the corresponding user account, with speaker identification features of the uttered keyword. For example, if the user's username is determined to be "John," the system associates the username "John," and thus the registered user account associated with the username John, with speaker identification features of keyword (e.g., "Google") that was detected.

In the example of FIG. 1, three user accounts have been registered with the server 108: a first user account associated with a username "Matt", a second user account associated with a username "John", and a third user account associated with the username "Dominik." Each account may be associated with, and provide its respective owner with access to, a collection of personal resources such as the account owner's contact list, calendar, email, voicemail, social networks, biographical information, financial information, applications and the like. Access to such personal resources can be controlled locally by the server 108 or can be distributed, in whole or in part, across one or more server computer systems.

During, or as a result of, the registration session, the server 108 derives a set of MFCCs from the uttered keyword, and stores the MFCC's in association with the user's account (e.g., in the storage device 128). Alternatively or in addition, the server 108 may derive a GMM from the uttered keyword. This set of MFCC's and/or GMM corresponds to the text-dependent model for the user. During, or as a result of, the registration session, the server 108 also derives a text-independent model from the user's utterance and stores the text and dependent model in association with the user's account (e.g., in the storage device 132). The server 108 may derive the text-independent model from the entire user's utterance (e.g., "Google: this is Matt"), or from only the portion of the utterance following the keyword (e.g., "this is Matt"). The text-independent model may be, for example, a GMM, a hidden Markov model (HMM), or any other model suitable for text-independent speaker recognition.

Following the registration session, each time one of the users in the speech-enabled environment utters the keyword "Google," the server 108 can classify the speaker by performing speaker identification using the text-dependent models associated with the keyword. In addition, the server 108 can classify the speaker by performing voice recognition on the utterance using text-independent models that are derived from the initial registration session. By combining the classifications obtained using the text-dependent models and the text-independent models, the server 108 can achieve more accurate identification of the speaker. After identifying the speaker, the server 108 may then give the user access to his or her account and the related resources.

In operation, the speaker recognition engine 120 first receives an audio signal 122 corresponding to the encoded utterance 104 from the user 102. The audio signal 122 may be an analog or digital representation of sound in the environment of an embodiment that is captured by a microphone 112, 114. The speaker recognition engine 120 includes several modules for performing speaker recognition. Modules may be any combination of software, firmware, and/or hardware components configured to perform the functions described herein. The modules include a keyword detector module 124, a text-dependent analyzer module 126, a text-independent analyzer module 130, and the speaker classifier module 134. The speaker recognition engine also includes or has access to storage device 128 and storage device 132, which stored text-dependent in text-independent models associated with user accounts. The storage devices 128, 132, may be a memory, hard disk drive, or any other suitable storage device, and may be local to the server 108 or may be remotely located.

Upon receiving the audio signal 122, the keyword detector module 124 processes the audio signal 122 to determine whether it includes a keyword. For example, the keyword detector module 124 may perform speech recognition on the audio signal 122 to identify a portion of the signal corresponding to the keyword. In some implementations, the keyword detector module 124 may use speaker-agnostic speech recognition models such as HMMs to identify the keyword. When the keyword is identified, the keyword detector 124 communicates the portion of the audio waveform 122 associated with the keyword to the text-dependent analyzer 126.

The text-dependent analyzer module 126 analyzes the portion of the audio signal 122 that corresponds to the keyword. In particular, the text-dependent analyzer module 126 determines a confidence level associated with one or more text-dependent models stored in a memory 128 that is accessible to the speaker recognition engine 120. Each of the text-dependent models is associated with a user account that is registered with the speech-enabled environment. For example, the "Matt" user account is associated with a text-dependent model 140a, the "John" user account is associated with a text-dependent model 142a, and the "Dominik" user account is associated with a text-dependent model 144a.

To determine the confidence level associated with each of the text-dependent models, the text-dependent analyzer module 126 compares speaker identification features (e.g., MFCC features, which collectively can form a feature vector) of the uttered keyword with speaker identification features of each of a one or more previous utterances of the keyword that are associated with user accounts registered with the server 108. In some implementations, each of the previous keyword utterances corresponds to a different known speaker (e.g., known to, and having a corresponding username and account on, the server 108 in FIG. 1). Alternatively or in addition, the server 108 can collect and maintain (and use in the speaker recognition evaluation) two or more instances of utterances of the keyword for each known speaker. For example, during operations the server 108 can store additional instances of the keyword that it determines have been uttered by a particular user in association with that user's account in a retraining process. Advantageously, a speaker identification process that has available multiple examples of the target keyword (against which to compare the current, uttered word) may be more accurate and robust.

In particular, the text-dependent analyzer module 126 determines how closely the speaker identification features of the uttered keyword match the speaker identification features of one of the stored instances of the keyword. For example, in some implementations, the text-dependent analyzer module 126 may perform dynamic time warping (DTW) on the MFCCs from the uttered keyword. As a result of performing DTW, the text-dependent analyzer module 126 determines one or more confidence levels corresponding to likelihoods that a particular speaker spoke the utterance. Alternatively or in addition, in some implementations the text-dependent analyzer model 126 may analyze the MFCCs from the uttered keyword using a GMM trained on previous utterances of the keyword by the user.

The confidence level in some implementations may be a normalized value between 0.0 and 1.0. For example, based on the DTW analysis, the text-dependent analyzer module 126 may determine a confidence level of 0.60 associated with the user account "Matt," a confidence level of 0.90 associated with the user account "John," and a confidence level of 0.30 associated with the user account "Dominik." As discussed above, each user account may have one or more stored instances of the keyword associated with it, and the confidence level may be for the closest matching instance of the keyword. Alternatively or in addition, the text-dependent analyzer module 126 may extract the MFCCs from the uttered keyword, compute an average MFCC and then perform a nearest neighbor analysis between the average MFCC of the uttered keyword with each of the plurality of previous utterances of the keyword. The nearest previous keyword utterance, provided it is within a threshold maximum allowed distance, may be determined to match the uttered keyword.

Next, a text-independent analyzer module 130 analyzes the audio signal 122. In particular, the text-independent analyzer module 130 determines a confidence level for one or more text-independent models stored in the storage device 132, where each of the text-independent models is associated with a user account. In some implementations, the text-independent analyzer module 130 may analyze only the portion of the audio signal 122 subsequent to the portion of the audio signal that corresponds to the keyword. In other words, if the keyword is "Google," then the text-independent analyzer module 130 would only analyze the portion of the audio signal after the term "Google." Alternatively or in addition, the text-independent analyzer module 130 may also analyze the keyword using text-independent models. In such implementations, the text-independent analyzer module 130 may output two confidence levels for each text-independent model, i.e., one confidence level associated with the portion of the audio signal 122 corresponding to the keyword and another confidence level associated with the subsequent portion of the audio signal 122. Moreover, in some implementations, the text-independent analyzer module 130 may analyze the entire audio signal 122 using the text-independent models. In such cases, the text-independent analyzer module 130 would again output a single confidence level for each text-independent model.

In the example of FIG. 1, the "Matt" user account is associated with a text-independent model 140b, the "John" user account is associated with a text-independent model 142b, and the "Dominik" user account is associated with the text-independent model 144b. As discussed above, the text-independent models may be GMMs, HMMs, or any other suitable models. The confidence level in some implementations may be a normalized value between 0.0 and 1.0. For example, based on the text-independent models, the text-independent analyzer module 130 may determine a confidence level of 0.45 associated with the user account "Matt," a confidence level of 0.85 associated with the user account "John," and a confidence level of 0.20 associated with the user account "Dominik." As discussed above, each user account may have one or more text-independent models associated with it, and the confidence level may be the highest confidence associated with a particular user account.

Finally, the speaker classifier 134 receives confidence data from the text-dependent analyzer 126 and the text-independent analyzer 130 and makes a determination as to the identity of the user 102. In particular, the speaker classifier 134 receives a confidence level based on one or more text-dependent models from the text-dependent analyzer 126. For example, the text-dependent analyzer 126 may provide the speaker classifier 134 with a confidence level of 0.90 associated with the user account "John." This confidence level corresponds to a likelihood of 90% that the user 102 was the user associated with the account "John." Likewise, speaker classifier 134 receives a confidence level based on one or more text-independent models from the text-independent analyzer 130. For example, the text-independent analyzer 130 may provide the speaker classifier 134 with a confidence level of 0.85 associated with the user account "John." This confidence level corresponds to a likelihood of 85% that the user 102 was the user associated with the account "John." In some implementations, the speaker classifier 134 may receive two or more confidence levels for a given text-independent model, for example in cases where the text-independent analyzer module 130 provides multiple confidence levels for a text-independent model as described above. The multiple confidence levels for the text-independent model may be combined to form an average confidence level for the text-independent models. This average may be a weighted average confidence level for the text-independent models.

The speaker classifier 134 then combines the confidence levels from the text-dependent models in the text-independent models to make a final determination as to the identity of the user 102. For example, the speaker classifier 134 may average the confidence levels associated with a given user account. Continuing the above example, the combined confidence level associated with the user account "John" would be 0.875.

In some implementations, the speaker classifier 134 may perform a weighted average of the confidence levels to obtain a final, combined, confidence level. For example, the confidence level associated with the text-dependent model may be weighted more heavily than the confidence level associated with the text-independent model (e.g., the confidence level of the text-dependent model could be multiplied by a weight of 0.75 while the confidence level of the text-independent model could be multiplied by weight of 0.25). Alternatively, the confidence level associated with the text-independent model may be weighted more heavily than the confidence level associated with the text-dependent model (e.g., the confidence level of the text-dependent model could be multiplied by a weight of 0.25 while the confidence level of the text-independent model could be multiplied by weight of 0.75).

In some implementations, the weighting associated with the text-dependent and text-independent models may vary over time. In particular, the confidence level associated with the text-dependent model may initially be weighted more heavily than the confidence level associated with the text-independent model. This initial weighting may reflect the higher accuracy of the text-dependent model during initial operations. But over time, as the text-independent models are trained by subsequent utterances of users, the text-independent models may become more accurate and may be weighted more heavily than the text-dependent models. The server 108 may change the weighting between the text-dependent models in the text-independent models based on a number of utterances by a user associated with the models. Specifically, the server 108 may weight the text-independent models more heavily after the server determines that a given number of utterances have been processed by a particular user. For example, after 10, 15, 20, or 25 utterances by a user associated with a particular user account, the server 108 may increase the weighting given to text-independent models associated with that user account. In some implementations, the server 108 may increase the weighting multiple times as it processes additional utterances by a given user.

Based on the combined confidence level, the speaker classifier 134 determines whether the speaker 102 of the utterance 104 is associated with any of the user accounts that are registered with the server 108. To continue the example above, assuming that the combined confidence level associated with the user account "John" is 0.85, and also that this combined confidence level is the highest confidence level for all of the user accounts registered with the server 108, the speaker classifier 134 may identify the speaker 102 as the user "John."

In some implementations, the speaker classifier 134 may apply a minimum threshold such as, for example, 0.50, 0.40, 0.30, or 0.20. If the combined confidence level fails to exceed the minimum threshold, the speaker classifier 134 may determine that the speaker 102 of the utterance 104 is not associated with any user account that is registered with the server 108. In such an instance, the server 108 may provide an indication to the user 102 that the speaker was not recognized. The server 108 may then provide an additional opportunity for the user 102 to speak the voice command.

Optionally, if the keyword was not successfully speaker-identified (and assuming that the associated query requires personal information or other user-specific resources to satisfy), the server 108 can challenge the user for his or her identity, e.g., by asking who has spoken the utterance detected. The server 108 can then use speech recognition to analyze the user's response (e.g., "this is Matt") to determine that the user is Matt and subsequently fulfill the query using Matt's personal information or other user-specific resources.

In an example, the server 108 may determine that the user associated with the uttered keyword fails to correspond to any of the known usernames. This situation could happen, for example, if the server 108 is new or has been reconfigured or if ambient noise or the like interferes with the voice recognition of the uttered keyword. As a result of the failure to identify the user, the server 108 prompts the user to make an identification utterance (e.g., using synthesized voice output the system states "who are you?" or "state your name"). The server 108 then performs speech recognition on the identification utterance made in response to the prompting to determine a username of the user. For example, if in response to the prompt the user responded "this is Matt" or simply "Matt," the server 108 could determine that the word "Matt" was spoken by the user and assume that the user had just spoken his username. The server 108 then performs a registration session on the utterance for the user as described above. Going forward, the system will then be able to identify Matt when he speaks the keyword and, in response, give him access to his account and its related resources.

After determining the identity of the speaker, the server 108 may provide the speaker that made the utterance with access to one or more resources associated with the speaker. For example, if the speaker recognition engine 120 determined that the speaker identification features of the user's "Google" utterance sufficiently matched those of a previous utterance of the word "Google" by John, then the server 108 would decide that the user that spoke the utterance 104 was the user with the username "John" and thus would grant that user access to the resources associated with John's account registered on the server 108. As a result, the command or query following John's utterance of the keyword "Google" would be handled based on the context that the speaker is John and that John's personal information and other account resources represent the relevant body of information.

Once the speaker recognition engine 120 has identified a particular speaker, the server 108 may use the utterance of that speaker to further train the text-dependent and/or text-independent models. For example, the server 108 may store MFCCs from the portion of the audio signal 122 as an additional text-dependent model associated with the user account in the storage device 128. Alternatively or in addition, the server 108 may perform additional training of the text-independent model (e.g., the GMM) associated with that speaker using the MFCCs from the entire audio signal 122 and/or the remainder of the audio signal 122. In such cases, the server 108 may require the combined confidence for the utterance to exceed a minimum threshold to trigger the retraining, which may be greater than the minimum threshold for speaker identification.

Variations on the techniques described above may be implemented. For example, any appropriate keyword may be used as desired and the format of the utterances to the system need not necessarily conform to the format [KEYWORD] [QUERY]. Potentially, the keyword may occur at any location within the utterance. In addition, to enhance system security, the system could implement a verification step to further confirm the speaker's identity (that is, in addition to performing voice recognition on the spoken keyword). For example, the system could ask the user for the name of a person to whom an email was sent from the purported user's account within the past 24 hours. Moreover, recognition of the keyword and recognition of the speaker's identity can be performed independently of each other and potentially at different locations (e.g., the keyword can be recognized at the local system and the speaker can be recognized at a remote server or vice versa). Similarly, fulfillment of the query or command can be performed at the local system or at a remote server or a combination of the two.

Figure 2:
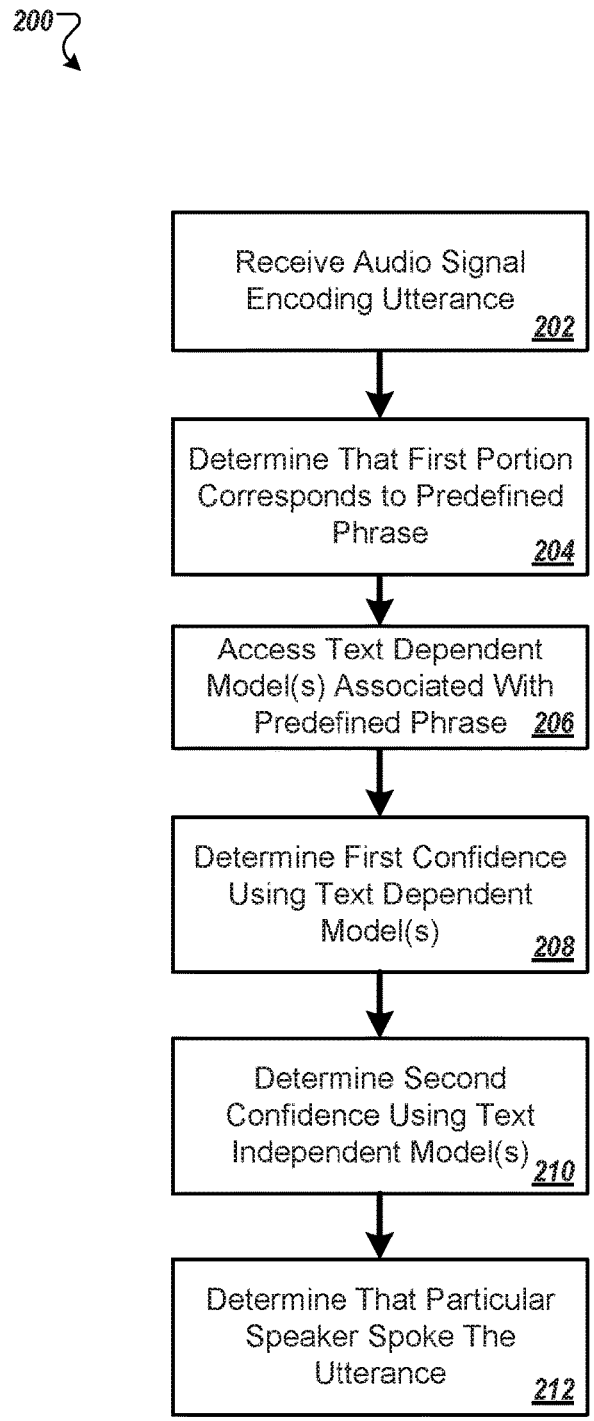
FIG. 2 is a flow chart of an example process for speaker identification using a combination of text-dependent and text-independent models.

FIG. 2 shows an example process 200 for speaker identification using a combination of text-dependent and text-independent models. In the context of FIG. 1, the process 200 can be performed in whole or part at the server 108, at one or more other servers, or distributed among those locations.

In step 202, the server receives an audio signal encoding an utterance. Next, in step 204, the server determines that a first portion of the audio signal corresponds to a predefined phrase (e.g., a keyword). The predefined phrase may be one or more words that are spoken by users during a registration session.

The server then accesses one or more text-dependent models associated with the predefined phrase in step 206. In some implementations, the one or more text-dependent models may be one or more sets of MFCCs associated with the predefined phrase, where each set of MFCC's is associated with an individual speaker.

Then, in step 208, the server determines the first confidence based on the one or more text-dependent models associated with the predefined phrase. The first confidence corresponds to the first likelihood that a particular speaker spoke the utterance. The particular speaker may be one speaker from among a plurality of speakers that are registered with the server. In some implementations, the server may determine the first confidence by comparing one or more sets of MFCC's with a set of MFCC's derived from the first portion of the audio signal.

In step 210, the server determines a second confidence for a second portion of the audio signal using one or more text-independent models. The second confidence corresponds to a second likelihood that the particular speaker spoke the utterance. The second portion of the audio signal may be, for example, a portion of the audio signal subsequent to the portion of the audio signal corresponding to the predefined phrase. In some implementations, the server derives a set of MFCC's from the second portion of the audio signal. The server may then access one or more GMMs, where each GMM is associated with an individual speaker, i.e., each GMM corresponds to a text-independent model that is associated with a particular user account. The server may then process the set of MFCCs derived from the second portion of the audio signal using each of the GMMs to determine the second confidence.

Some implementations also involve the server analyzing the portion of the audio signal including the predefined phrase using one or more text-independent models to determine a third confidence. The third confidence corresponds to a third likelihood that a particular speaker generated the utterance.

Finally, in step 212, the server determines that the particular speaker spoke the utterance based at least in part on the first confidence and the second confidence. In particular, the server may combine the first confidence and the second confidence to generate a combined confidence. This combined confidence may be an average or weighted average of the first and second confidence. Where the combined confidence is a weighted average, the first confidence (i.e., corresponding to the text-dependent model) may be weighted more heavily than the second confidence (i.e., corresponding to the text-independent model). Alternatively, in some implementations, the second confidence may be weighted more heavily than the first confidence. Furthermore, in some implementations, the weighting may change over time, e.g., weighting the text-independent model more heavily as the server processes more utterances from a particular user. In some cases, the server may determine that the combined confidence for the particular speaker is greater than a combined confidence for any other speaker that is registered with the server. The server also may determine that the combined confidence for the particular speaker satisfies a predetermined threshold. In implementations that include a third confidence level, the server may make the determination based on the first, second, and third confidence levels.

Some implementations further involve updating the text-dependent model and/or the text-independent models associated with the particular speaker when the confidence for the speaker satisfies a threshold. This threshold may be different than (e.g., higher than) the threshold for determining that the particular speaker spoke the utterance. In such implementations, the server may combine the first confidence and the second confidence to generate a combined confidence and determine whether the combined confidence for the particular speaker is greater than a threshold for updating the text-dependent and/or text-independent models for the particular speaker. In some aspects, the text-dependent model and the text-independent models may have separate thresholds for triggering an update. These separate thresholds may depend on the combined confidence. Alternatively or in addition, the server may analyze the confidence for the text-dependent models to trigger an update of the text-dependent models and analyze the confidence for the text-independent models to trigger updates of the text-independent models. If the confidence is greater than the threshold, the server may initiate an update of a text-dependent model associated with the particular speaker, a text-independent model associated with the particular speaker, or both, using the audio signal encoding the utterance. For example, the server may store MFCCs from the portion of the audio signal as an additional text-dependent model associated with the user account of the particular speaker. Alternatively or in addition, the server may perform additional training of the text-independent model (e.g., the GMM) associated with that speaker using the MFCCs from the audio signal. Further, the server may transmit the audio signal to another processing system to perform an update of the text-dependent and/or text-independent models.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a processing system on data stored on one or more computer-readable storage devices or received from other sources.

The term "processing system" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, during a speech registration session and by a speech-enabled home device that includes one or more microphones for detecting utterances spoken in a home environment, a single registration utterance by a user that includes a hotword and an introduction declaration;
registering the user by a server-based voice authentication device that includes an automated speech recognizer and that is associated with the speech-enabled home device, wherein registering includes training, by the server-based voice authentication device, a text-dependent speaker identification model using the hotword of the single registration utterance and training, by the server-based voice authentication device, a text-independent speaker identification model using the introduction declaration of the single registration utterance;
after the speech registration session is concluded, receiving, by the speech-enabled home device, an authentication utterance by the user that includes the hotword and a voice command that is different from the introduction declaration;
in response to receiving the authentication utterance by the user that includes the hotword and the voice command that is different from the introduction declaration, authenticating, by the server-based voice authentication device, the user, wherein authenticating includes processing the hotword of the authentication utterance by the server-based voice authentication device using the text-dependent speaker identification model and processing the voice command using the text-independent speaker identification model;
in response to authenticating the user by the server-based voice authentication device, providing, by the server-based voice authentication device, access to an access-controlled personal resource of the user without requiring the user to submit any further authentication information other than the single registration utterance by the user that includes the hotword and the introduction declaration to the speech-enabled home device; and
providing a personalized response to the voice command to the speech-enabled home device, for output.

2. The method of claim 1, wherein the hotword comprises:
one or more terms that are used to both (i) trigger processing of an utterance and (ii) perform speaker identification.

3. The method of claim 1, wherein the introduction declaration comprises:
one or more terms in the utterance that follow the hotword.

4. The method of claim 1, wherein the voice command comprises:
one or more terms that indicate an action to be performed.

5. The method of claim 1, further comprising providing access to a resource of the user that is not accessible until the user is authenticated.

6. The method of claim 1, comprising:
during the speech registration session, requesting that the user speak the single registration utterance.

7. A system comprising:
one or more computers and one or more storage devices storing instructions that are operable, when executed by the one or more computers, to cause the one or more computers to perform operations comprising:
receiving, during a speech registration session and by a speech-enabled home device that includes one or more microphones for detecting utterances spoken in a home environment, a single registration utterance by a user that includes a hotword and an introduction declaration;
registering the user by a server-based voice authentication device that includes an automated speech recognizer and that is associated with the speech-enabled home device, wherein registering includes training, by the server-based voice authentication device, a text-dependent speaker identification model using the hotword of the single registration utterance and training, by the server-based voice authentication device, a text-independent speaker identification model using the introduction declaration of the single registration utterance;
after the speech registration session is concluded, receiving, by the speech-enabled home device, an authentication utterance by the user that includes the hotword and a voice command that is different from the introduction declaration;
in response to receiving the authentication utterance by the user that includes the hotword and the voice command that is different from the introduction declaration, authenticating, by the server-based voice authentication device, the user, wherein authenticating includes processing the hotword of the authentication utterance by the server-based voice authentication device using the text-dependent speaker identification model and processing the voice command using the text-independent speaker identification model;
in response to authenticating the user by the server-based voice authentication device, providing, by the server-based voice authentication device, access to an access-controlled personal resource of the user without requiring the user to submit any further authentication information other than the single registration utterance by the user that includes the hotword and the introduction declaration to the speech-enabled home device; and
providing a personalized response to the voice command to the speech-enabled home device, for output.

8. The system of claim 7, wherein the hotword comprises:
one or more terms that are used to both (i) trigger processing of an utterance and (ii) perform speaker identification.

9. The system of claim 7, wherein the introduction declaration comprises:
one or more terms in the utterance that follow the hotword.

10. The system of claim 7, wherein the voice command comprises:
one or more terms that indicate an action to be performed.

11. The system of claim 7, further comprising: providing access to a resource of the user that is not accessible until the user is authenticated.

12. The system of claim 7, the operations comprising:
during the speech registration session, requesting that the user speak the single registration utterance.

13. One or more non-transitory computer-readable media storing software comprising instructions executable by one or more computers which, upon such execution, cause the one or more computers to perform operations comprising:
receiving, during a speech registration session and by a speech-enabled home device that includes one or more microphones for detecting utterances spoken in a home environment, a single registration utterance by a user that includes a hotword and an introduction declaration;
registering the user by a server-based voice authentication device that includes an automated speech recognizer and that is associated with the speech-enabled home device, wherein registering includes training, by the server-based voice authentication device, a text-dependent speaker identification model using the hotword of the single registration utterance and training, by the server-based voice authentication device, a text-independent speaker identification model using the introduction declaration of the single registration utterance;
after the speech registration session is concluded, receiving, by the speech-enabled home device, an authentication utterance by the user that includes the hotword and a voice command that is different from the introduction declaration;
in response to receiving the authentication utterance by the user that includes the hotword and the voice command that is different from the introduction declaration, authenticating, by the server-based voice authentication device, the user, wherein authenticating includes processing the hotword of the authentication utterance by the server-based voice authentication device using the text-dependent speaker identification model and processing the voice command using the text-independent speaker identification model;
in response to authenticating the user by the server-based voice authentication device, providing, by the server-based voice authentication device, access to an access-controlled personal resource of the user without requiring the user to submit any further authentication information other than the single registration utterance by the user that includes the hotword and the introduction declaration to the speech-enabled home device; and
providing a personalized response to the voice command to the speech-enabled home device, for output.

14. The media of claim 13, wherein the hotword comprises:
one or more terms that are used to both (i) trigger processing of an utterance and (ii) perform speaker identification.

15. The media of claim 13, wherein the introduction declaration comprises:
one or more terms in the utterance that follow the hotword.

16. The media of claim 13, wherein the voice command comprises:
one or more terms that indicate an action to be performed.

17. The method of claim 1, comprising determining a weighted combination of a confidence level associated with the text-dependent speaker identification model and a confidence level associated with the text-independent speaker identification model;
wherein authenticating the user comprises evaluating the weighted combination.

18. The method of claim 1, wherein authenticating the user based on the authentication utterance comprises weighting a confidence level associated with the text-dependent speaker identification model and a confidence level associated with the text-independent speaker identification model using a first weighting;
- wherein the method includes:
    - training the text-independent speaker identification model based on one or more subsequent utterances;
    - after training the text-independent speaker identification model based on one or more subsequent utterances, receiving a second authentication utterance; and
    - authenticating the user based on the second authentication utterance, comprising weighting a confidence level associated with the text-dependent speaker identification model and a confidence level associated with the text-independent speaker identification model using a second weighting that is different from the first weighting.

19. The method of claim 18, wherein the first weighting more heavily weights the confidence level associated with the text-dependent model compared to the confidence level associated with the text-independent model.

20. The method of claim 18, further comprising determining to use the second weighting for authentication based on the second authentication utterance based on determining that at least a predetermined number of utterances of the user have been processed by the server-based voice authentication device.

\* \* \* \* \*